Sept. 8, 1959 A. J. GLENN 2,903,603

TRANSISTOR MONO-STABLE SWEEP GENERATOR

Filed Dec. 9, 1954

INVENTOR.
ARTHUR J. GLENN

BY George Lipkin
George E. Pearson
ATTORNEYS 2,903,603
Patented Sept. 8, 1959

2,903,603

TRANSISTOR MONO-STABLE SWEEP GENERATOR

Arthur J. Glenn, Albuquerque, N. Mex., assignor to the United States of America as represented by the Secretary of the Navy Application December 9, 1954, Serial No. 474,305

2 Claims. (Cl. 307—88.5)

(Granted under Title 35, U.S. Code (1952), sec. 266)

The invention described herein may be manufactured and used by or for the Government of the United States of America for governmental purposes without the payment of any royalties thereon or therefor.

This invention relates to point-contact transistor monostable sweep generators and more specifically to a sweep generator for use in a transistorized radar repeater indicator requiring a linear sawtooth sweep voltage of constant width insensitive to frequency.

Sweep generators performing this type of operation have been built with vacuum tubes. However, the problem of obtaining a linear sawtooth has always been difficult to overcome and generally several tubes are required to produce the constant pulse width as well as the linear sawtooth voltage. Multivibrator, blocking oscillator, and gas discharge types of vacuum tube circuits have been used, requiring many tubes, with the resulting increased power consumption. Other transistor multivibrator circuits have been constructed but these do not maintain the necessary constant pulse-width when the trigger rate is changed and the resulting waveforms need additional shaping to be useful. In addition the sawtooth sweep voltage has too long a retrace time and is nonlinear.

The point-contact transistor multivibrator circuit of the present invention is unique in that it operates as a sweep generator for a transistorized radar indicator with a wide constant pulse insensitive to frequency and produces a linear sawtooth voltage. The point-contact transistor is normally operated at saturation as a monostable multivibrator to obtain various timing waveforms. Since the timing takes place during cut-off, wide waveforms are produced with small capaciors from extremely low trigger frequencies to frequencies up to an 80% duty cycle.

An object of this invention is the provision of a transistorized monostable multivibrator for use as a time-base generator in a radar indicator.

Another object is the provision of a time-base generator which will produce a linear sawtooth sweep voltage of constant width insensitive to frequency.

Another object is the provision of a time-base generator with extremely low power consumption as compared to vacuum tube types.

Another object is the provision of a time-base generator which will initially produce acceptable waveforms without additional shaping circuits.

Another object is the provision of a multivibrator simple in design, inexpensive in manufacture, and reliable in operation.

Other objects and many of the attendant advantages of this invention will be readily appreciated as the same becomes better understood by reference to the following detailed description when considered in connection with the accompanying drawings wherein.

Figure 1:
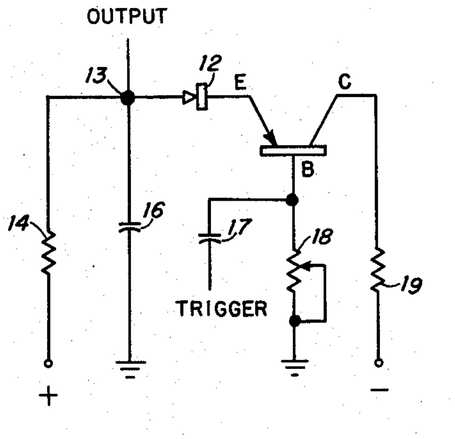
Fig. 1 shows a diagram of the monostable multivibrator.
Figure 2:
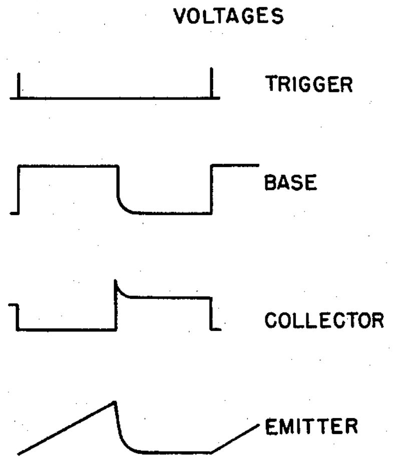
Fig. 2 shows the voltage waveform curves.

Referring now to Fig. 1 there is shown transistor 11 to which is connected emitter, base and collector circuits at the emitter E, base B and collector C thereof. The negative side of diode 12 is connected to emitter E whereas the positive side is connected to a terminal point 13 to which a positive voltage source is connected through resistor 14, and a ground connection is made through condenser 16. The base B of transistor 11 is connected to ground through variable resistor 18 while the collector C is connected to a negative voltage source through resistor 19. A positive trigger pulse source is connected to the base B through condenser 17.

This circuit, fundamentally a monostable multivibrator, is normally at saturation. The various resistors and voltages are chosen so as to provide a triggering voltage differential $\Delta Ve$, Fig. 3, the emitter voltage and current are adjusted to place the quiescent point far enough along the saturation region to prevent triggering from external electrical noise or voltage surges. By applying a small positive trigger to the base B, the circuit instantly switches to the cut-off region. The capacitor 16 between the emitter circuit and ground tends to maintain the voltage impressed upon the emitter E at constant value. However, since the emitter is "leaky," that is, it draws a small back current in the cut-off region, the capacitor 16 charges toward a positive potential at a rate determined by the back current flowing from the emitter E. Normally this back current would vary from several hundred microamps to zero during the pulse width time ($t$) that the capacitor is charging. However by inserting a crystal diode 12 in series between the capacitor 16 and the emitter E, a variable series resistance is thereby provided which tends to regulate the current to a constant value. The crystal diode 12 is operated in its reverse current region where a relatively large change in back voltage has little effect in changing the reverse current. Thus the reverse current remains relatively constant at an extremely low value. As the voltage on the capacitor 16 increases (goes positive), the current trickles into the capacitor 16 from the emitter E at a constant rate as determined by the crystal diode 12. Thus the crystal diode acts as a constant current device by introducing a variable series resistance in the emitter circuit which changes directly with the voltage impressed upon it. This constant current flowing into the capacitor 16 produces a linear rise in the capacitor voltage with time—hence a linear sawtooth. This is expressed by the equation $$i=C\frac{de}{dt}$$

where C=capacitance of the condenser 16, $e$=voltage across and $i$=current through the capacitor, and $t$=time. For $de/dt$ to be constant, to provide a linear sawtooth, and since C is also constant, it remains only for $i$ to be made constant, which is done by the use of diode 12. The voltage impressed upon the emitter E is sufficient to hold the emitter in the cut-off region during the time ($t$) that the capacitor 16 is charging at a constant rate. This temporary quiescent point is a fraction of a volt from the zero emitter current region. During this time ($t$) the voltage on the emitter increases (goes positive) by this fraction of a volt and at the emitter zero current region, the transistor 11 immediately switches to saturation. The heavy saturation current rapidly discharges the capacitor 16, and the transistor 11 returns to its original state to be recycled by the next trigger pulse. Because the capacitor 16 is discharged so rapidly and because the voltage on the emitter in the saturation region stabilizes rapidly, the frequency of the triggering pulses may be varied without changing the pulse width. (However, it will decrease slightly if the trigger pulse arrives before the capacitor has fully discharged.) The duty cycle of the circuit is approximately 70%.

Figure 3:
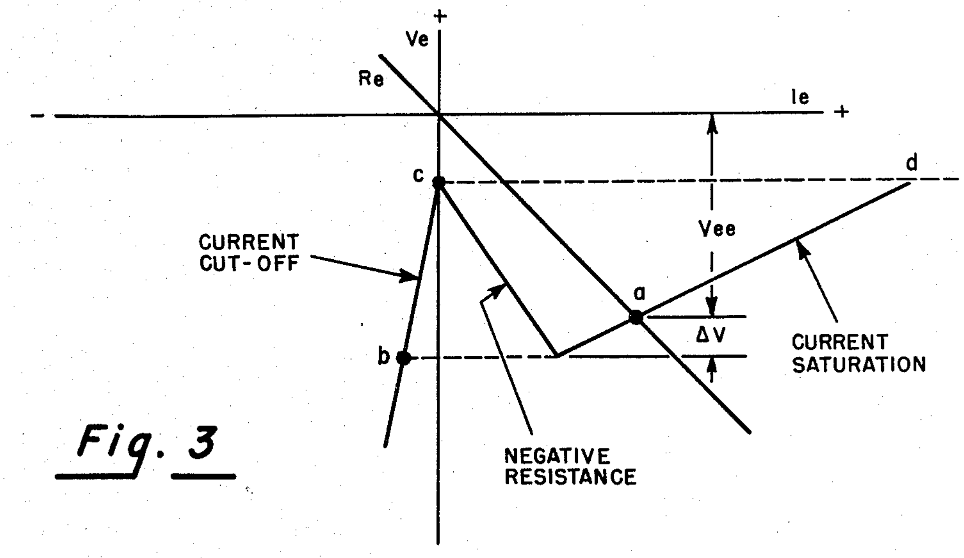
Fig. 3 shows the emitter operating characteristic for the multivibrator.

Reference is now made to Fig. 3 so that the operation may be described by consideration of the emitter voltage VS emitter current characteristic. The quiescent state of the circuit is biased by the voltage $V_{ee}$ so that it is in the current saturation region. Point *a* is set back along the saturation portion of the characteristic slightly to prevent noise impulses from actuating the circuit. When a trigger voltage of negative polarity is applied to the emitter or of positive polarity to the base, the load line $R_e$ moves the short distance along the saturation portion of the curve and, upon reaching the negative resistance region, flips instantly to the cut-off region, designated at point *b*. The capacitor in the emitter circuit tends to keep the voltage impressed upon the emitter at a constant value. However, since the emitter has a finite back resistance, the capacitor charges toward a positive potential at a rate determined by the amount of back current flowing in the emitter circuit. This current varies, as can be noted by observing the characteristic. By inserting a diode and using the back resistance as a non-linear element, this current can be regulated to a constant value, which accounts for the linear rise in emitter voltage, as is evident from the fundamental relation, $i=C\ (de/dt)$. If $de/dt$ is to be constant, as is required for a linear sawtooth waveform, it is sufficient that $i/C$ remain constant. The diode is operated in its constant reverse-current region. A large change in voltage has little effect on changing the current when the current is at a low value.

The emitter voltage rises linearly to point *c*, where the load line shifts to point *d*. This rise occurs instantaneously and, since the capacitor is charged, the point *d* lies far out on the saturation portion of the characteristic because the voltage across a capacitor cannot change instantaneously. The capacitor now discharges rapidly, the current being high, and the load line returns along the characteristic to point *a* to await another pulse to cause the entire operation to repeat.

The duty cycle may be easily increased to 80% by simply decreasing the value of the collector load resistor 19 and thus discharging the capacitor 16 at a more rapid rate. Also by the insertion of feedback or the addition of resistor biased crystal diodes in the various transistor legs, the characteristics may be improved to provide stable operation and still give a faster discharge time. Another method would be to include another transistor in this circuit to provide more rapid action and thus a higher duty cycle. Instead of a positive pulse source connected to the base of transistor 11, a negative pulse source may be connected to point 13 in the emitter circuit.

Obviously many modifications and variations of the present invention are possible in the light of the above teachings. It is therefore to be understood that within the scope of the appended claims the invention may be practiced otherwise than as specifically described.

What is claimed is:

1. An electrical circuit for providing a linear sawtooth sweep voltage comprising a transistor, a trigger pulse source and a first capacitor in series connected to the base of said transistor, a ground resistor connected to said base in parallel with said trigger source and said capacitor, a first potential source having its negative terminal connected to the collector of said transistor and its positive terminal connected to ground, a crystal diode having one terminal connected to the emitter of said transistor to provide a constant current therefor, a second capacitor having one side grounded and the other side connected to the other terminal of said diode and a second potential source having its positive terminal connected to said other terminal of said diode and its negative terminal grounded for normally applying a voltage to said emitter to bias said transistor to an operating point in the current saturation region immediately adjacent the negative resistance region of the characteristic curve of said transistor, whereby said operating point is shifted into the cut-off region and the voltage on said second capacitor rises at a constant rate until the voltage on said emitter rises at a constant rate to a predetermined value and is then shifted to a point far out on said saturation region to return to said operating point as said second capacitor is instantly discharged through the transistor.

2. In a time base generator of the character described in combination, a transistor, a network having a series resistor and potential source arrangement in parallel with a capacitor, said potential source normally applying a voltage to the emitter of said transistor to bias said transistor to an operating point in the current saturation region immediately adjacent the negative resistance region of the characteristic curve of said transistor, a potential source for biasing the collector of said transistor, a crystal diode interposed between said emitter and the resistor capacitor junction of said network in such a manner as to present the high back resistance of said diode to current flow from said emitter to said junction, trigger pulse means for providing trigger pulses to the base of said transistor, and a grounded resistor connected to said base in parallel with said trigger pulse means, whereby said operating point is shifted into the cut-off region and the voltage on said capacitor rises at a constant rate until the voltage on said emitter rises at a constant rate to a predetermined value and is then shifted to a point far out on said saturation region to return to said operating point as said capacitor is instantly discharged through the transistor.

References Cited in the file of this patent

UNITED STATES PATENTS

| | | |
|---|---|---|
| 2,531,076 | Moore | Nov. 21, 1950 |
| 2,627,039 | MacWilliams | Jan. 27, 1953 |
| 2,629,834 | Trent | Feb. 24, 1953 |
| 2,666,139 | Endres | Jan. 12, 1954 |
| 2,768,294 | Overbeek | Oct. 23, 1956 |
| 2,793,303 | Fleisher | May 21, 1957 |